United States Patent [19]

Nicholson

[11] Patent Number: 4,785,843

[45] Date of Patent: Nov. 22, 1988

[54] MULTIPLEXED AUTOMATIC CONTROL SYSTEM

[76] Inventor: Laurence R. Nicholson, 14328 Lookout Road, Nevada, Calif. 95959

[21] Appl. No.: 162,015

[22] Filed: Feb. 29, 1988

[51] Int. Cl.[4] .......................................... F16K 17/36
[52] U.S. Cl. ................................ 137/78.3; 137/624.11; 239/64
[58] Field of Search .................... 137/624.11, 78.3; 239/63, 64

[56] References Cited

U.S. PATENT DOCUMENTS

| | | | |
|---|---|---|---|
| 3,771,548 | 11/1973 | Rauchwerger | 137/78.3 |
| 3,991,375 | 11/1976 | Riggs et al. | 239/64 |
| 4,137,931 | 2/1979 | Hasenbeck | 137/78.3 |
| 4,197,866 | 4/1980 | Neal | 137/78.3 |
| 4,246,574 | 1/1981 | Sanner | 239/63 |
| 4,718,446 | 1/1988 | Simpson | 137/78.3 |

Primary Examiner—A. Michael Chambers
Attorney, Agent, or Firm—Keith D. Beecher; Jessup Beecher

[57] ABSTRACT

A control system and circuit for use with one or more inductance-type actuators, such as solenoid controlled water sprinkler valves, having a relatively low impedance at low frequencies, which serves to operate the actuators, for example, when ground moisture falls below a preset level. A sensor having a relatively high impedance at low frequencies, and which for example may be moisture variable, is provided for each actuator. The control circuit is connected to the actuator over appropriate electric leads, and the same leads are used to connect the sensor back to the control circuit thereby obviating the need for extra wires and difficult retrofits.

11 Claims, 4 Drawing Sheets

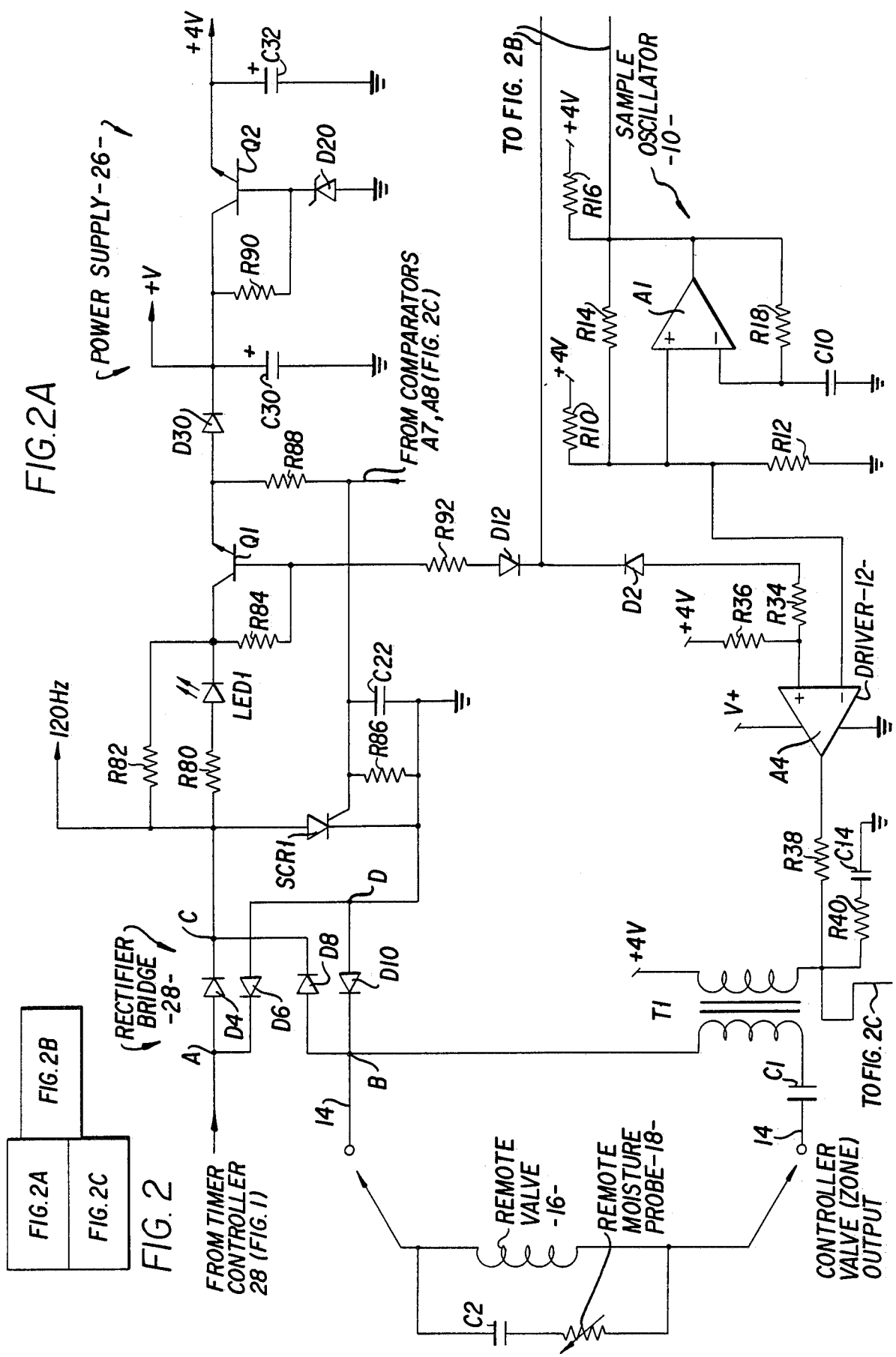

MULTIPLEXED AUTOMATIC CONTROL SYSTEM

BACKGROUND OF THE INVENTION

Irrigation systems exist in the prior art which include automatic control circuits for electrically energized sprinkler valves that turn on the valves when the moisture level in the soil drops below a predetermined value. However, such systems for the most part require separate leads from the sensors to the control circuits, in addition to the leads carrying energizing current to the valves.

The irrigation control system disclosed in Evelyn-Veere et al U.S. Pat. No. 4,176,395 comprises a system in which the moisture sensor signals are sent to a central station over the same leads which carry the energizing power to the valves. However, the system described in this patent uses digitizing techniques and requires relatively complex electrical circuitry at the valves and at the central control station.

SUMMARY OF THE INVENTION

The multiplexed control system of the present invention has general application, which will become evident as the description proceeds, in systems using electrically energized inductive actuators, such as solenoid devices which exhibit relatively high impedance at high frequencies, and sensors which exhibit relatively high impedance at low frequencies. In accordance with one embodiment of the invention to be described herein, a moisture sensor is connected in parallel with a solenoid valve in an irrigation system, with the moisture sensor being embedded in the soil near the site of the valve. The solenoid valve exhibits low impedance at 60 Hz, and the moisture sensor is designed to exhibit relatively high impedance at 60 Hz. Accordingly, when 60 Hz valve-energizing power is applied to common leads extending to the valve and the sensor, most of the 60 Hz current passes through the solenoid winding of the valve and the valve is operated. However, when the control system applies an 8-10 KHz current, for example, to the common leads a significant portion of the current passes through the moisture sensor because the valve solenoid exhibits relatively high impedance in that frequency range. Since the characteristics of the valve solenoid and leads are fixed, changes in sensor resistance due to moisture variations in the soil can easily be detected in the 8-10 KHz frequency range.

BRIEF DESCRIPTION OF THE DRAWING

FIGS. 2A, 2B and 2C collectively represent a more detailed circuit diagram of the system of FIG. 1.

DETAILED DESCRIPTION OF THE ILLUSTRATED EMBODIMENT

Figure 1:
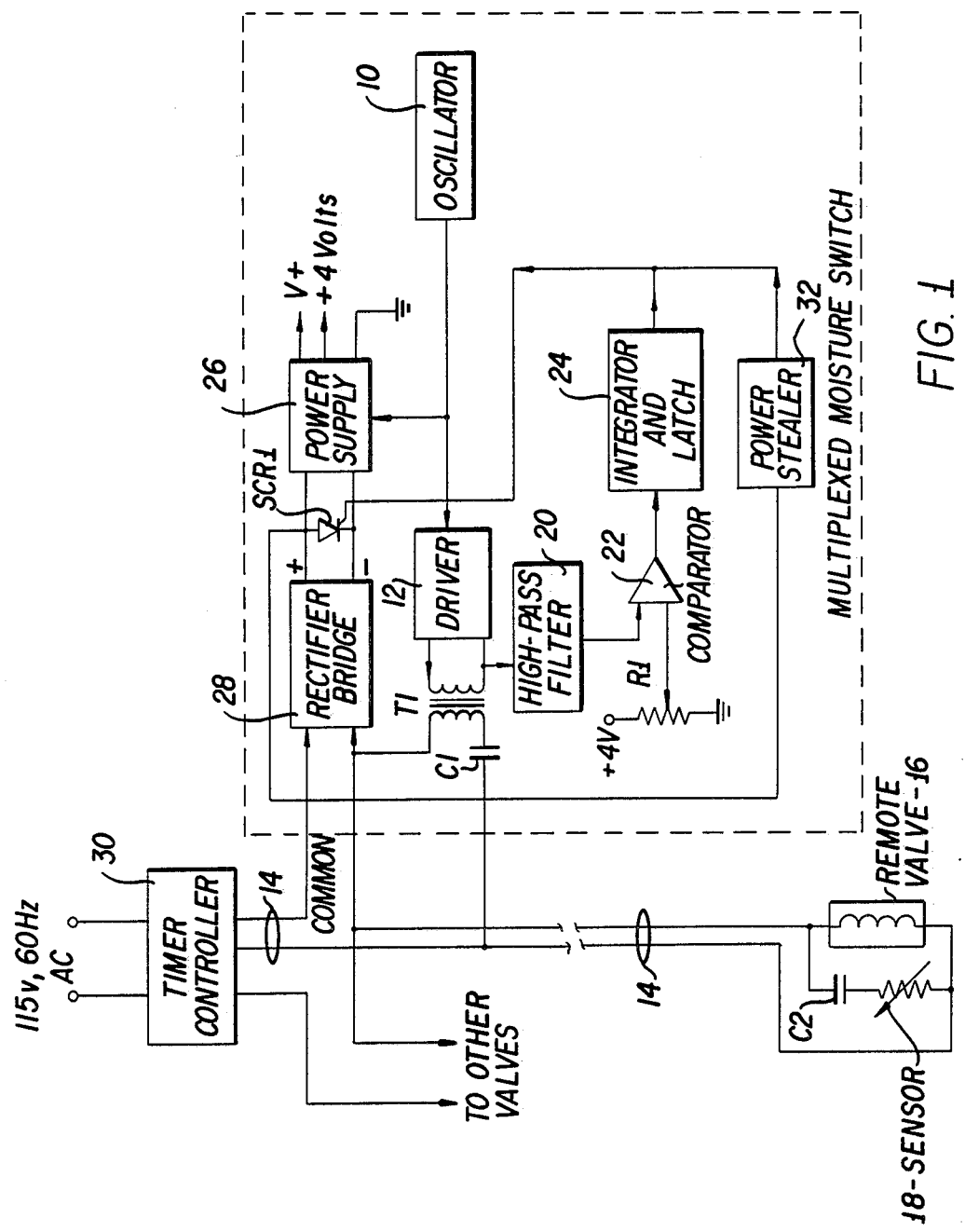
FIG. 1 is a schematic block diagram representing one embodiment of the multiplexed moisture switching system of the invention as used in an irrigation system.

The system of FIG. 1 includes an oscillator 10 which generates an output of a frequency, for example, of 8 KHz. The output from oscillator 10 is applied to the primary winding of a transformer T1 through a driver stage 12. The output from driver 12 is also passed through a high pass filter 20 to one input of a comparator 22. The other input of the comparator is connected to the movable arm of a potentiometer R1 which serves as a level adjustment control. The output of comparator 22 is connected to an integrator and latch circuit 24.

The output of latch 24 is used to trigger silicon controlled rectifier SCR1. The silicon controlled rectifier SCR1 is interposed between a bridge rectifier 28 and a power supply 26.

The system is controlled by a timer controller 30 which connects to a usual 115-volt 60 Hz power source. One of a pair of leads 14 from the controller extends directly to one terminal of the solenoid winding of a remote watering valve 16 which is controlled by the system. The other lead 14 extends through rectifier bridge 28 to the other terminal of the solenoid winding of remote valve 16.

The rectifier bridge 28 and a silicon controlled rectifier SCR1 act as a switch for valve 16, as will be described. So long as the silicon controlled rectifier SCR1 is off, the switch is off and minimum current flows through the solenoid winding of valve 16. However, when SCR1 is triggered to a conductive state, the switch is on and the solenoid coil is energized and valve 16 is turned on.

A sensor 18 in the form of a moisture-sensitive resistor, or other moisture-responsive device, is connected in series with a capacitor C2, or other high-pass filter network, across the solenoid winding of valve 16. Sensor 18 is buried in the soil in the vicinity of the valve. Capacitor C2, for example, has a capacitance of 0.1 microfarads. The moisture-sensitive resistor of sensor 18 exhibits, for example, resistance in a range of 700 ohms to 25 kilo-ohms as the moisture content of the soil changes from a saturated to a dry condition (in fertile soil).

The secondary of transformer T1 is coupled through a capacitor C1 to transmit the 8 KHz output from oscillator 10 to sensor 18 over the same leads 14 which supply energizing current to solenoid valve 16. A power stealer 32 is wire-or'd with the output of latch 24, for purposes to be described.

Sensor 18 exhibits high impedance to the low frequency line current on leads 14 which powers valve 16, by virtue of series capacitor C2, so that the line current flows primarily through the solenoid winding of valve 16 to energize the valve. The inductive solenoid winding of valve 16, on the other hand, exhibits high impedance to the 8 KHz current on leads 14, and the latter current flows primarily through sensor 18.

If the soil in the vicinity of sensor 18 is relatively moist when timer controller 30 first turns on the system, the resistance of sensor 18 will be relatively low, and the flow of the 8 KHz current through the sensor will be relatively high. During this condition, the resulting 8 KHz current flow in the primary of transformer T1 will produce a relatively low voltage 8 KHz signal at the output of high pass filter 20 of a magnitude, when compared with the adjusted voltage level set by the level adjust potentiometer R1, such that latch 24 is set to its first state to produce an output which causes the SCR1 to be non-conductive. Accordingly, so long as the moisture content of the soil remains above a certain level, valve 16 remains off. The system now assumes a moisture-sensing mode during which it monitors the resistance of the sensor 18.

During the moisture-sensing mode, the system continues to monitor the resistance of sensor 18, and as the soil dries out, the resistance of the sensor will rise, and the 8 KHz voltage at the output of the high pass filter 20 will also rise until it reaches a value that causes comparator 22 to set latch 24 to its second state. When latch 24 is in its second state, the SCR1 is triggered, and solenoid valve 16 is then energized by the 60 Hz line current and the valve is turned on. Oscillator 10 is now de-energized and the system then discontinues its moisture-sensing mode, and the valve remains on until controller 30 times out.

When the system is in the moisture-sensing mode, and prior to the turning on of valve 16, it initially assumes an idle state and later assumes a monitoring state. This is necessary because the power supply 26 of the control circuit derives its line frequency power through the solenoid winding of valve 16, as shown in FIG. 1. If the line current to the control circuit is flowing through the solenoid while the system is attempting to read the 8 KHz current through sensor 18, the line current will modulate the 8 KHz current making reading of the sensor current more difficult.

Accordingly, the system shown in FIGS. 1, 2A, 2B and 2C, is designed so that when it is first energized by controller 30, and if the soil condition is such that valve 16 is not to be turned on, no attempt is made to sense the 8 KHz sensor current until the filter capacitors in power supply 26 have become fully charged and the flow of 60 Hz line current through the solenoid winding of valve 16 ceases. For this purpose, a sample control circuit (to be described) is incorporated into the system to turn off oscillator 18 during the filter capacitor charging interval. In this way, the reading of the 8 KHz sensor current occurs only when no significant line current is flowing through the solenoid winding of valve 16. This enables the simple level comparator 22 to be used for reading the 8 KHz sensor current.

As described above, when valve 16 is turned on, oscillator 18 is turned off, and the system no longer senses the resistance of sensor 18. As also explained, the valve then remains on until timer/controller 30 times out. When the valve is on, power stealer circuit 32 controls the output of latch 24 to cause SCR1 to be triggered late in each alternating current cycle to maintain the flow of 60 Hz line current to the valve 16, and also to regulate the input of power supply 26 to provide low level direct current power supply voltages to the control circuitry.

Figure 2B:
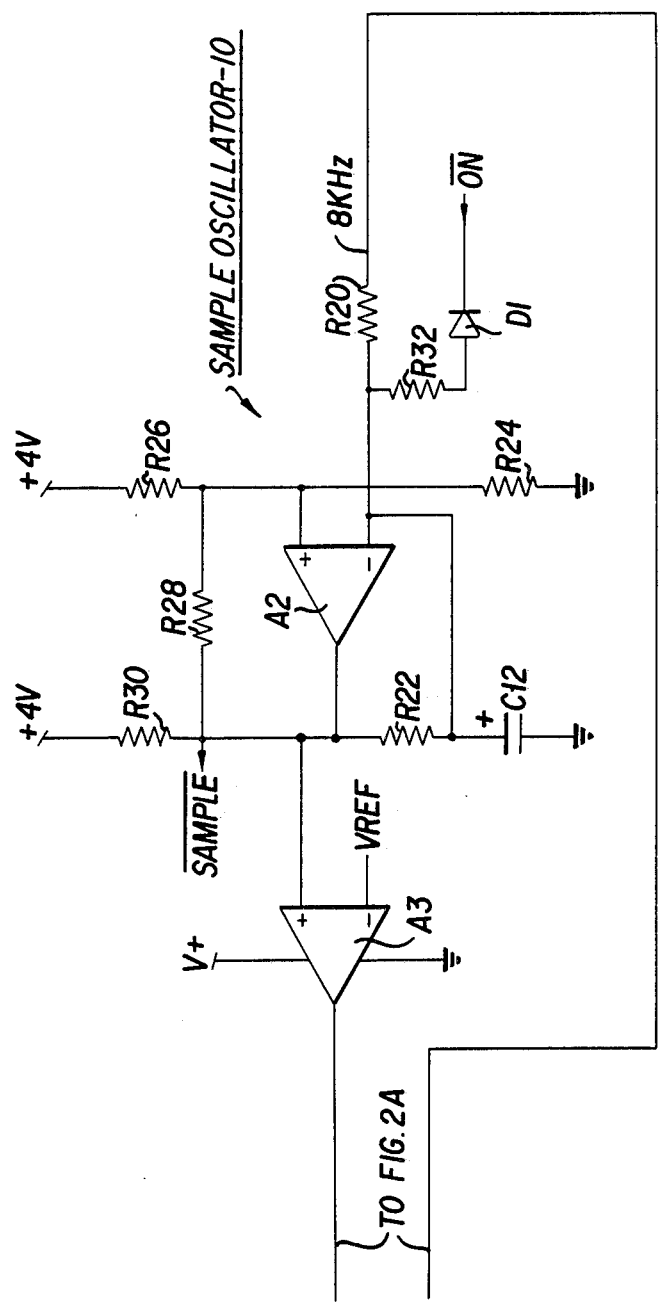
Figure 2C:
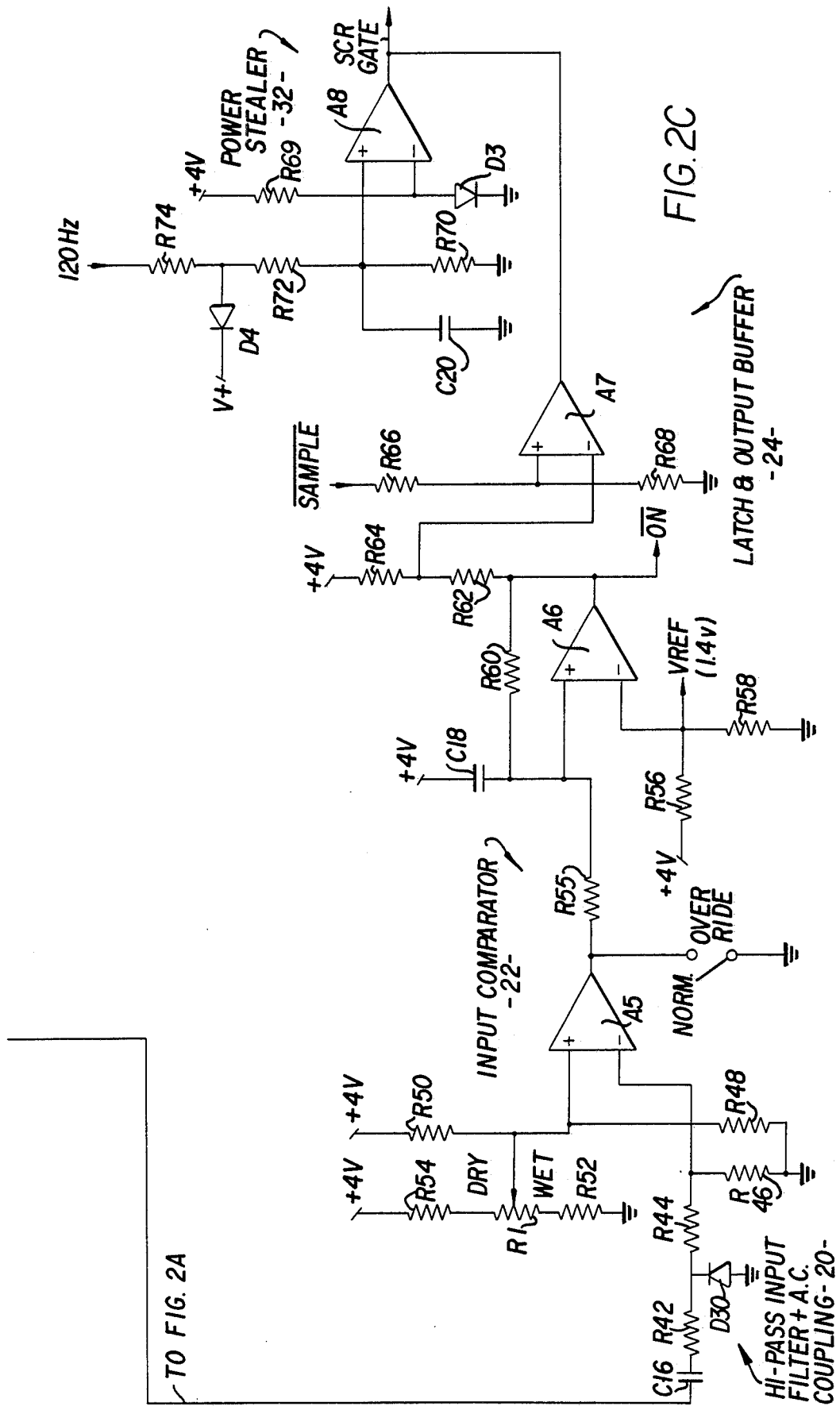

As shown in FIGS. 2A, 2B and 2C, the 8 KHz oscillator 10 is formed of a comparator A1 (FIG. 2A), whose positive input is connected through a 100 kilo-ohm resistor R10 to the voltage output of power supply 26, and to a grounded 100 kilo-ohm resistor R12. The output of comparator A1 is connected back to the positive input through a 100 kilo-ohm resistor R14 and is also connected through a 10 kilo-ohm resistor R16 to the +4 volt terminal of power supply 26 (FIG. 1). The output of amplifier A1 is also connected to the negative input through a 100 kilo-ohm resistor R18 which is connected to a 0.001 microfarad grounded capacitor C10. The output of amplifier A1 is also connected through a 1 megohm resistor R20 to the negative input of an amplifier A2 (FIG. 2B).

The negative input of comparator A2 is connected to a grounded 1 microfarad capacitor C12 and through a 150 kilo-ohm resistor R22 to the output of comparator A2. The output of comparator A2 is also connected to the positive input of a further comparatgor A3. The negative input of comparator A3 is connected to a 1.4 volt voltage reference point designated $V_{ref}$. The positive input of comparator A2 is connected to a grounded 1 megohm resistor R24 and through a 1 megohm resistor R26 to the +4 voltage terminal. The positive input is also connected through a 1 megohm resistor R28 to the output terminal of A2. This output is designated SAMPLE. The output of compratator A2 is also connected through a 150 kilo-ohm resistor R30 to the +4-volt positive terminal.

An input terminal designated $\overline{ON}$ is connected through a diode D1 and through a 47 kilo-ohm resistor R32 to the negative input of amplifier A2. Diode D1 may be of the type designated 1N914B. The output of comparator A3 is connected through a diode D2 and through an 82 kilo-ohm resistor R34 to the positive input of a comparator A4 (FIG. 2A) which forms the driver 12. The positive input of comparator A4 is also connected through a 100 kilo-ohm resistor R36 to the +4 volt positive terminal. The comparators A1-A4 may all be formed on a single integrated circuit chip of the type designated LM339.

The output of comparator A4 is connected through a 330 ohm resistor R38 to one side of the primary winding of transformer T1. The other side of the primary is connected to the positive 4-volt terminal of power supply 26. Resistor R38 is also connected to a 150 ohm resistor R40 which, in turn, is connected to a grounded 0.01 microfarad capacitor C14. The junction of resistors R38 and R40 are coupled through a 0.001 microfarad capacitor C16 and through a 27 kilo-ohm resistor R42 and a 47 kilo-ohm resistor R44 to the negative input of a comparator A5. The common junction of resistors R42 and R44 are connected to a grounded diode D30 which may be of the type designated 1N914B. Capacitor C16 and its associated components form the high pass input filter 20 of FIG. 1.

The negative input of comparator A5 is also connected to a grounded 47 kilo-ohm resistor R46. The positive input of comoparator A5 is connected to a grounded 91 kilo-ohm resistor R48, and through a 100 kilo-ohm resistor R50 to the +4 V terminal of power supply 26. The positive input of comparator A5 is also connected to the movable arm of potentiometer R1 which is connected to an 18 kilo-ohm grounded resistor R52 and through a 100 kilo-ohm resistor R54 to the +4-volt terminal.

Potentiometer R1 forms the level adjust control of FIG. 1, and comparator A5 and its associated components form the input comparator 22.

The output of comparator A5 is connected through a 10 kilo-ohm resistor R55 to the positive input of a comparator A6, and to a 0.1 microfarad capacitor C18 connected to the +4 V terminal. The negative input of comparator A6 is connected to the junction of a 270 kilo-ohm resistor R56 and a grounded 150 kilo-ohm resistor R58. Resistor R56 is connected to the +4 V voltage terminal. The voltage VREF (1.4 volts) is produced at the junction of resistors R56 and R58, and that point is connected to the negative input of comparator A3. The output of comparator A6 is connected through a 270 kilo-ohm resistor R60 back to the positive input, and through a pair of series-connected resistors R62 and R64 to the +4 V terminal. Resistor R62 may have a resistance of 10 kilo-ohms, and resistor R64 may have a resistance of 100 kilo-ohms. The term $\overline{ON}$ is produced at the output of comparator A6, and is applied to diode D1 of the 8 KHz oscillator circuit.

The junction of resistors R64 and R62 is connected to the negative input of a comparator A7. The negative input of comparator A7 is connected to a grounded 150 kilo-ohm resistor R68. The positive input of the comparator is connected to the junction of a 1 megohm resistor R66 and a 560 kilo-ohm grounded resistor R68. A term $\overline{SAMPLE}$ is applied to resistor R66. Comparators A6 and A7 and associated circuitry form the latch and output buffer 24 of FIG. 1.

The output of comparator A7 is applied to the gate of silicon controlled rectifier SCR1 (FIG. 2A). Power stealer circuit 32 includes a comparator A8 whose output is also applied to the gate SCR1. The negative input of comparator A8 is connected to a grounded diode D3 which may be of the type designated 1N914B, and through a 100 kilo-ohm resistor R69 to the +4-volt terminal. The positive input of comparator A8 is connected to a 150 kilo-ohm grounded resistor R70 which is shunted by a 0.01 microfarad capacitor C20. Resistor R70 is connected to a 1 megohm resistor R72 which, in turn, is connected to a 270 kilo-ohm resistor R74. The positive terminal V+ to power supply 26 is connected to a diode D4 which, in turn, is connected to the junction of resistors R72 and R74. Diode D4 may also be of the type designated 1N914B. Comparators fiers A5, A6, A7 and A8 may all be included on a single integrated circuit chip of the type designated LM339. A 120 Hz signal obtained from the output of rectifier bridge 28 is applied to resistor R74.

The rectifier bridge 28 of FIG. 1 is formed of four diodes D4, D6, D8 and D10, as shown in FIG. 2A, each of which may be of the type designated 1N4002. The bridge has a first input terminal A which is connected to the timer/controller 30 of FIG. 1, and it includes a second terminal B which is connected over one of the leads 14 to the remote valve. The terminal B is also connected to one side of the secondary transformer T1, whose other side is coupled through coupling capacitor C1 to the other lead 14. Capacitor C1 may have a capacitance, for example, of 0.1 microfarads.

The rectifier bridge 28 has a third terminal C which is connected to a 150 ohm resistor R80 and to a 330 ohm resistor R82. The 120 Hz signal applied to the power stealer 32 is developed at terminal C. The bridge has a fourth terminal D which is grounded.

Terminal C is also connected to the silicon controlled rectifier SCR1, which may be of the type designated C106F, and the silicon controlled rectifier is also connected to ground, as shown. Resistor R80 is connected through a light emitting diode LED1 to the collector of an NPN transistor Q1 which may be of the type designated 2N4401. The LED may be of the type designated MV5020. The collector is connected through a 47 kilo-ohm resistor R84 to the base of transistor Q1. The base of transistor Q1 is connected to a 6.8 kilo-ohm resistor R92 which is connected to diode D12, and then to diode D2 at the input of driver 12. Diodes D12 and D2 may each be of the type designated 1N914B.

The common output from the latch and output buffer 24 and power stealer 32 is termed SCR gate, and that output is applied to the gate of SCR1. The gate is also connected to a 1 kilo-ohm grounded resistor R86 which is shunted by a 0.1 microfarad capacitor C22. The gate of SCR1 is also connected to the emitter of NPN transistor Q1 through a 6.8 kilo-ohm resistor R88. The emitter is also connected through a diode D30 of the type designated 1N914B to the collector of a NPN transistor Q2 which may be of the type designated 2N3904. The transistors Q1 and Q2, and their associated circuitry form the power supply 26. The power supply produces a first direct current voltage V+ at the collector of transistor Q2, which is used to energize power stealer 32. The collector of transistor Q2 is connected to its base through a 10 kilo-ohm resistor R90, the base being connected to ground through a Zener diode D20 of the type designated 1N5231B. The +4-volt direct current voltage for the circuitry is produced at the emitter of transistor Q2. The power supply includes a first filter capacitor C30 of 100 microfarads connected between the collector of transistor Q2 and ground, and it includes a second filter capacitor C32 of 10 microfarads connected between the emitter of transistor Q2 and ground.

As described above, when the system is first turned on by the timer controller 30 of FIG. 1, 60 Hz alternating line current is applied to the power supply 26 through rectifier bridge 28 to cause the power supply to produce the V+ and +4 V direct current voltages for the control circuitry. The system now enters its moisture sensing mode due to the forced "off" condition of latch 24.

Oscillator 10 now generates an 8 KHz frequency signal to be applied to the positive input of driver 12. However, the signal is not applied to the driver immediately because the circuitry of amplifiers A2 and A3 assumes a state which prevents passage of the signal through the driver. The 8 KHz signal is not applied to the driver 12 for a predetermined time interval, and until filter capacitors C30 and C32 are fully charged, as explained above. At the end of that interval, the circuitry of amplifiers A2 and A3 switches state, and the 8 KHz signal is applied to the driver A4, and to the primary of transformer T1.

An 8 KHz voltage is now developed across resistor R46, whose amplitude is indicative of the resistance of the moisture probe 18. When that voltage increases to a predetermined level, established by the setting of potentiometer R1, the output of comparator A5 will pulse activating the latch 24. After a short time period, the circuit of comparator A2 will cause the $\overline{SAMPLE}$ term to go into a high state into comparator A7, so that the gate of SCR1 may be triggered, permitting line current to flow to the remote valve 16. At that time, the term $\overline{ON}$ will assume a state such as to return the circuit of amplifiers A2 and A3 to their original state effectively turning off the 8 KHz oscillator.

When the silicon controlled rectifier SCR1 is being triggered, the power stealer 32 will control the triggering of the SCR gate in a manner such that reduced power is applied to power supply 16 so that its output voltages may be maintained at a lower level.

It is evident that probe 18 may also take the form of a simple capacitive sensor or, where long distances are involved, of active and passive filters.

Also, the particular control circuit illustrated in the drawings may take other forms of analog circuitry, digital-analog circuitry, and/or microcontroller or microcomputer controlled circuitry.

Moreover, the particular circuitry illustrated and described herein may be replaced by equivalent integrated circuits.

Also, the multiplexed control system of the invention is not limited particularly to irrigation control systems, but finds application in conjunction with a wide range of inductive-type actuators, including for example, electric motors, pumps, relays, and the like.

Moreover, various types of sensors, other than moisture sensors may be used, for example, rain sensors, wind sensors, temperature sensors, pressure sensors, flow sensors, and so on.

The invention provides, therefore, an improved control circuit for a remote inductive actuator which requires a simple sensor, and which incorporates a relatively simple control circuit for responding to indications from the sensor to control the operation of the actuator, with all controls being effectuated over the same lines which supply line current to the actuator.

It will be appreciated that while a particular embodiment of the invention has been shown and described, modifications may be made. It is intended in the claims to cover all modifications which come within the true spirit and scope of the invention.

I claim:

1. A control system for controlling at least one actuator having a relatively low impedance at low frequencies comprising: a source of energy of relatively low frequency for energizing the actuator; a pair of leads connecting the source of energy to the actuator; a sensor having a relatively high impedance at low frequencies connected to the leads; an oscillator for generating a sensing signal of relatively high frequency, and means coupling the high frequency signal from said oscillator to said leads to be supplied to said sensor over said leads; switching means connected to at least one of said leads for controlling the energization of the actuator by the energy from said source; and control circuitry connected to said leads and responsive to said high frequency sensing signal flowing in the leads and through the sensor for operating said switching means to energize the actuator when the impedance of said sensor means reaches a predetermined value.

2. The control system defined in claim 1, in which said actuator comprises a solenoid valve.

3. The control system defined in claim 2, in which said sensor is a moisture-sensitive type.

4. The control system defined in claim 3, in which said sensor includes moisture-sensitive resistor means and high-pass filter means.

5. The control system defined in claim 1, in which said control circuitry comprises a comparator form comparing the amplitude of said high frequency sensing signal flowing in said leads with a pre-set reference level, and in which said control circuitry includes a latch circuit connected to the output of said comparator and to said switching means to actuate said switching means and energize said actuator when the amplitude of said sensing signal flowing in said leads reaches said pre-set reference level.

6. The control system defined in claim 5, and which includes circuit means connected to said latch and to said coupling means to cause said coupling means to introduce the output of said oscillator to said leads until the amplitude of said sensing signal reaches said pre-set reference level.

7. The control system defined in claim 6, in which said circuit means includes a means for causing said coupling means to introduce the output of said oscillator to said leads only after a predetermined time interval before the amplitude of the sensing signal has reached the pre-set reference level.

8. The control system defined in claim 5, in which said switching means comprises a silicon controlled rectifier having a gate electrode connected to the latch to cause the latch to trigger the silicon controlled rectifier when the amplitude of the sensing signal reaches said predetermined pre-set level.

9. The control system defined in claim 8, in which said control circuitry includes a further circuit connected to the gate electrode of the silicon controlled rectifier to control the timing of the triggering of the silicon controlled rectifier.

10. The control system defined in claim 9, and which includes a direct current power supply connected in circuit with said silicon controlled rectifier to be regulated by the triggering of the silicon controlled rectifier by said further circuit and said latch.

11. The control system defined in claim 10, and which includes a bridge rectifier connected to said source of alternating current energy and to said silicon controlled rectifier and power supply, and in which said further circuit triggers the silicon controlled rectifier at a predetermined point in each cycle of the alternating current energy from said source.

* * * * *